(12) United States Patent
Moselage, III

(10) Patent No.: US 9,056,429 B2
(45) Date of Patent: Jun. 16, 2015

(54) EXPOSING FIBERS IN COMPOSITE LAMINATES

(71) Applicant: The Boeing Company, Chicago, IL (US)

(72) Inventor: John Henry Moselage, III, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 13/664,492

(22) Filed: Oct. 31, 2012

(65) Prior Publication Data

US 2014/0119813 A1 May 1, 2014

(51) Int. Cl.
*B32B 38/10* (2006.01)
*B32B 37/00* (2006.01)
*B29C 70/54* (2006.01)
*B29C 65/00* (2006.01)
*B29C 65/48* (2006.01)

(52) U.S. Cl.
CPC ............. *B29C 70/54* (2013.01); *Y10T 403/477* (2015.01); *Y10T 156/10* (2015.01); *B29C 66/721* (2013.01); *B29C 65/4835* (2013.01); *B29C 66/02* (2013.01); *B29C 66/112* (2013.01); *B29C 66/1122* (2013.01); *B29C 66/114* (2013.01); *B29C 66/1142* (2013.01); *B29C 66/43* (2013.01); *B29C 66/73941* (2013.01); *B29C 66/72141* (2013.01); *B29C 66/73756* (2013.01)

(58) Field of Classification Search
USPC ........................................................ 216/7, 33
See application file for complete search history.

(56) References Cited

U.S. PATENT DOCUMENTS

| | | | | |
|---|---|---|---|---|
| 4,408,420 A | * | 10/1983 | Haase | ................................. 52/1 |
| 5,091,240 A | | 2/1992 | Kajander et al. | |
| 6,391,436 B1 | * | 5/2002 | Xu et al. | .................... 428/298.1 |
| 6,602,810 B1 | * | 8/2003 | Christensen et al. | ......... 442/232 |

FOREIGN PATENT DOCUMENTS

| DE | 3903153 A1 | 8/1990 |
|---|---|---|
| DE | 10352964 B3 | 10/2004 |
| DE | 102008063651 A1 | 7/2010 |

OTHER PUBLICATIONS

PCT Search Report and Written Opinion, dated Dec. 16, 2013, regarding Application No. PCT/US2013/060271, 10 pages.
"Reworking, Removing and 'Decapsulating' Cured Epoxies," Epoxy Technology Inc., copyright 2009, 1 page, accessed Oct. 10, 2012 http://www.epotek.com/SSCDocs/techtips/Tech%20Tip%208%20-%20Reworking%20Cured%20Epoxy.pdf.

* cited by examiner

*Primary Examiner* — Shamim Ahmed
(74) *Attorney, Agent, or Firm* — Yee & Associates, P.C.

(57) ABSTRACT

Fibers in a fiber reinforced resin laminate are exposed by placing a gel in contact with the resin laminate, forcing the fibers of the resin laminate into the gel, and using the gel to displace the resin surrounding the fibers being forced into the gel. The gel is removed to expose the fibers.

36 Claims, 10 Drawing Sheets

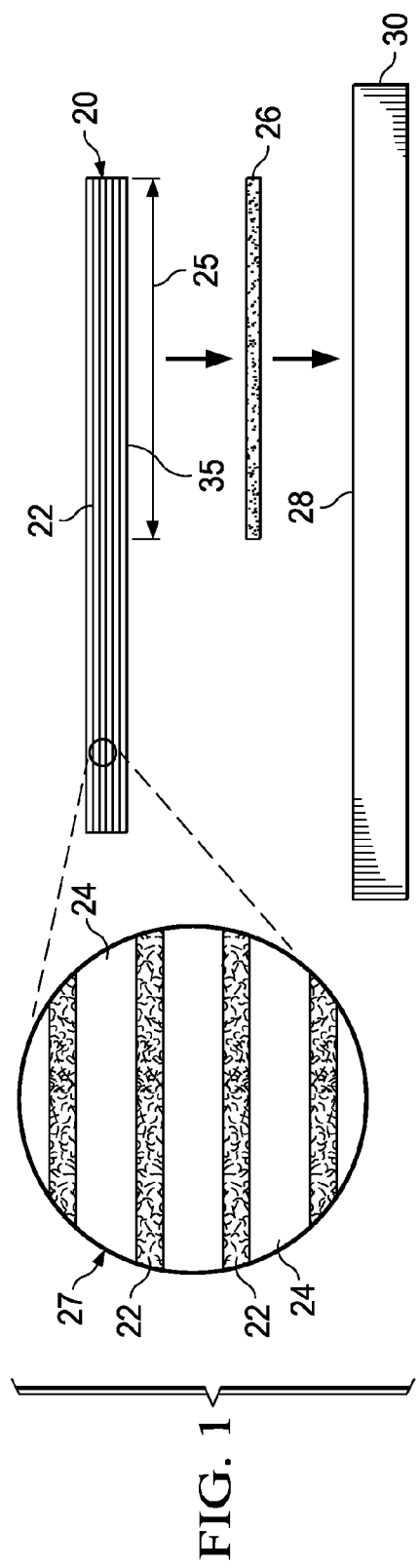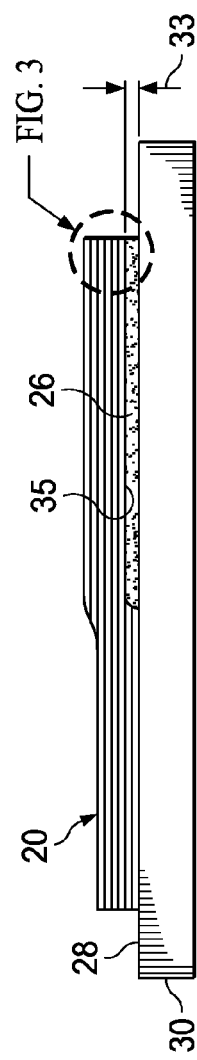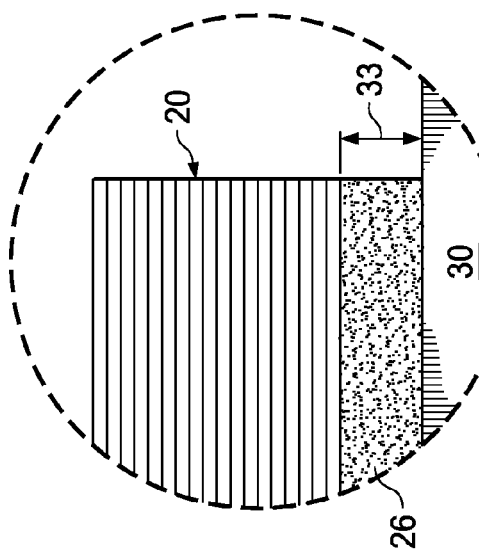

EXPOSING FIBERS IN COMPOSITE LAMINATES

BACKGROUND INFORMATION

1. Field

This disclosure generally relates to the fabrication of fiber reinforced resin laminates, and deals more particularly with a method of exposing the reinforcing fibers in a laminate. The disclosure also relates to a method of bonding fiber reinforced resin laminates.

2. Background

Several techniques are commonly used to join the faying surfaces of composite parts, such as fiber reinforced resin laminates. For example, faying surfaces of laminate parts may be joined together by compressing and co-curing them together. A relatively strong joint may be achieved by co-curing the laminates because the resin matrix along the faying surfaces of the parts flow together, consolidate and may cross-link during the curing process. Alternatively, faying surfaces of two pre-cured laminate parts may be joined together with a bonded joint using a bonding adhesive that is cured while the parts are compressed together, otherwise known as co-bonding and secondary bonding.

Under ideal conditions these bonded joints may be as strong and robust as those that result from co-curing the laminate parts. However, surface preparation must be near perfect and the margin for error when bonding the parts is quite small because the bonded area, commonly referred to as a bondline, is relatively thin and does not substantially encompass the reinforcing fibers of the laminate parts. Cracks may propagate along surfaces of bondlines that are not adequately prepared before bonding. Because of these problems, bonded joints are often reinforced with mechanical fasteners to provide an added measure of reliability. The use of mechanical fasteners is undesirable, however, because they add weight to the structure, require additional material and labor, and may necessitate the use of higher volumes of reinforcing fibers in order to compensate for possible weakening of the structure due to the presence of fastener holes.

Accordingly, there is a need for a method of joining fiber reinforced laminate parts using a bonded joint that provides the strength and reliability needed to reduce or eliminate the need for mechanical fasteners.

SUMMARY

The disclosed embodiments provide a method of exposing reinforcing fibers of fiber reinforced laminates. The reinforcing fibers may be exposed only along surfaces of the laminate, or throughout the entire thickness of the laminate. In one embodiment, exposing the reinforcing fibers along a surface of laminates allows faying surfaces of two laminate parts to be bonded together such that the exposed fibers of the two parts interpenetrate and allow the formation of a bonded lap joint suitable for high-performance applications. In another embodiment, exposing the reinforcing fibers throughout the entire thicknesses of two laminate parts allows the parts to be joined together by a bonded butt joint. The bonded joint is sufficiently robust and reliable such the need for mechanical fasteners may be reduced or completely eliminated for some applications. Bonded joints are achieved having improved strength and crack resistance due to the fact that the joints are formed by a volume of cured adhesive that envelops reinforcing fibers of both laminate parts through a substantial thickness. In contrast, traditional bonded joints rely on only a relatively thin layer of bonding adhesive that does not envelop the reinforcing fibers. A displacement gel used to expose the reinforcing fibers may also be employed to expose portions of a fiber preform reinforcement used in resin infusion processes. The disclosed method of exposing the reinforcing fibers may be easily carried out and integrated into conventional processes for laying up and curing laminate parts.

According to one disclosed embodiment, a method is provided of exposing fibers in a fiber reinforced resin laminate. The method comprises placing a gel in contact with at least a section of a surface of the resin laminate and forcing the fibers of the laminate into the gel by compressing the gel and the laminate together. The gel is used to displace resin surrounding the fibers being forced into the gel. The method may further comprise reducing the viscosity of the resin to a viscosity less than the viscosity of the gel. Reducing the viscosity of the resin may be performed by heating the laminate to a temperature at which the resin is flowable. The method may also comprise curing the laminate, including heating the laminate to a temperature that reduces the viscosity of the resin to a viscosity that is substantially less than the viscosity of the gel. The fibers are exposed by removing the gel from the fibers forced into the gel. Removing the gel may be performed by subjecting the gel to a solvent in which the gel dissolves. The gel may also be used to etch surfaces of the exposed fibers.

According to another disclosed embodiment, a method is provided of joining first and second fiber reinforced resin laminate parts. The method comprises placing a displacement gel against a faying surface of a first pre-preg laminate part layup, and placing a displacement gel against a faying surface of a second pre-preg laminate part layup. The first and second laminate part layups are cured to produce first and second cured laminate parts. The curing includes heating each of the first and second laminate part layups to a cure temperature. The first and second laminate part layups are compressed, and the displacement gel is used to displace resin and encapsulate the fibers along the faying surfaces during curing. The fibers along the faying surfaces are exposed by removing the gel that encapsulates the fibers. The faying surfaces of the first and second laminate parts may be placed in overlapping contact with each other, and the exposed fibers are infused with a bonding adhesive, which is then cured.

According to still another embodiment, a method is provided of bonding together two fiber reinforced resin laminates. The method comprises exposing reinforcing fibers in a section of each of the laminates, applying a bonding adhesive to the exposed fibers in the sections of each of the laminates, placing the sections of the laminates in contact with each other, and curing the bonding adhesive. Exposing reinforcing fibers in a section of each of the resin laminates is performed by reducing the viscosity of the resin of each of the laminates by heating the laminates, and using a gel to displace resin in the sections of the laminate. Exposing reinforcing fibers in a section of each of the resin laminates is performed by placing a gel in contact with each of the sections of the resin laminates, forcing the fibers of each of the resin laminate into the gel by compressing each of the resin laminates against the gel, and using the gel to displace resin surrounding the fibers being forced into the gel.

According to another disclosed embodiment, a resin infusion fiber preform reinforcement comprises reinforcing fibers having a portion thereof impregnated with a gel that substantially prevents infusion of the portion with resin. The gel has a viscosity substantially greater than the viscosity of the resin when the reinforcing fibers are infused with the resin.

According to still a further embodiment, a method is provided of fabricating a fiber reinforced composite part. The method comprises assembling a fiber preform reinforcement, impregnating a portion of the fiber preform reinforcement with a gel, and then infusing the fiber preform reinforcement with resin. A gel is used to prevent infusion of the portion of a fiber preform reinforcement with resin. Fibers in the portion of the fiber preform reinforcement are exposed by removing the gel. The gel has a viscosity substantially greater than the viscosity of the resin when the resin is infused into the fiber preform reinforcement.

According to a further embodiment, a method is provided of making a composite structure. The method comprises producing first and second fiber reinforced resin laminate parts, and exposing reinforcing fibers of the laminate parts along an edge of each of the parts. The method further comprises forming a butt joint between the edges of the first and second laminate parts. Forming the butt joint includes interpenetrating the exposed fibers along the edges of the first and second laminate parts, and infusing the interpenetrating exposed fibers with a bonding adhesive. Interpenetrating the exposed fibers is performed by axially displacing the first and second laminate parts toward each other until the exposed fibers of the edges overlap each other. The method may further comprise curing the bonding adhesive to join the first and second laminate parts. Exposing the reinforcing fibers includes displacing resin along the edges of the first and second laminate parts. The fibers are exposed throughout the entire thickness of the edges of the first and second laminate parts.

According to another disclosed embodiment, a method is provided of forming a butt joint between first and second fiber reinforced resin laminate parts. The method comprises exposing reinforcing fibers along an edge of each of the first and second laminate parts, and axially displacing the first and second laminate parts toward each other until the reinforcing fibers of each of the first and second laminate parts interpenetrate each other. The method further comprises infusing the interpenetrating reinforcing fibers with a bonding adhesive. Exposing the reinforcing fibers may be performed using a displacement gel to displace resin along the edges of each of the first and second laminate parts. The reinforcing fibers are exposed throughout the entire thickness of the first and second laminate parts.

According to a further embodiment, a composite laminate structure is provided comprising first and second fiber reinforced resin laminate parts joined by a butt joint. The butt joint includes interpenetrating fibers of the first and second laminate parts. The interpenetrating fibers of the first and second laminate parts overlap each other, and are infused with a bonding adhesive.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of an exploded, sectional view of a layup of a gel sheet and a fiber reinforced laminate part on a tool, a portion of the part being magnified to reveal the individual lamina.

FIG. 2 is an illustration of a view similar to FIG. 1, but showing the laminate part and a gel sheet having been laid up on the tool.

FIG. 3 is an illustration of a sectional view of the area designated as FIG. 3 in FIG. 2.

DETAILED DESCRIPTION

Figure 4:
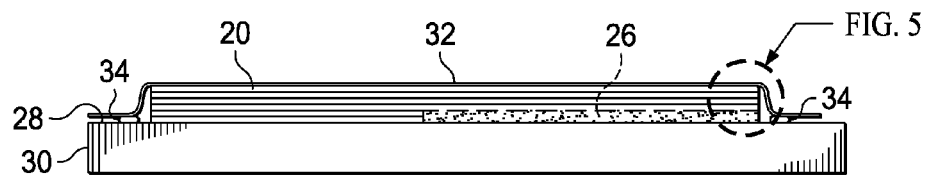
FIG. 4 is an illustration similar to FIG. 2, but showing a vacuum bag having been installed over the tool and evacuated to compress the laminate and a gel sheet against the tool during cure.

Referring first to FIG. 1, in one aspect, the disclosed embodiments relate to a method of exposing fibers 22 in a section 25 of a fiber reinforced resin laminate 20, which may be, for example, a pre-preg. As shown in the enlargement 27, an uncured laminate 20 may comprise a layup of pre-preg plies of a suitable resin matrix 24 reinforced with unidirectional or bidirectional reinforcing fibers 22. The fibers 22 may comprise any material suitable for the application, such as, without limitation, carbon, and the resin 24 may comprise a compatible polymer, such as, without limitation epoxy. Other fibers 22 and resins 24 are possible, including fiber reinforced thermoplastic resins. As will be discussed below in more detail, the section 25 of the laminate 20 where the fibers 22 are to be exposed may be a faying surface 35 that is intended to be joined to the faying surface 35 of another laminate in a secondary bonding operation.

In order to expose the reinforcing fibers 22 in a section 25 of the laminate 20, a displacement gel 26, which may be in the form of a strip or a sheet 26 having a selected thickness 33 (hereafter also sometimes referred to as a gel sheet 26 or gel ply 26), is placed against the laminate 20. For example, the gel sheet 26 may be placed on the surface 28 of the tool 30, and the laminate 20 may be placed on the tool 30, overlying the gel sheet 26 so that the gel sheet 26 is in face-to-face contact with the section 25 of the laminate 20 where the fibers 22 are to be exposed. The thickness 33 of the gel sheet 26 will generally correspond to the thickness of the exposed fibers in the laminate part 20 that are to be exposed.

FIGS. 2 and 3 illustrate the layup described above, in which the laminate 20 has been placed on top of a tool surface 28 overlying the gel sheet 26. The 2-D footprint of the gel sheet 26 substantially corresponds to the footprint of the section 25 of the laminate 20 where the fibers 22 are to be exposed. As will be discussed below in more detail, in one embodiment, the displacement gel 26 may comprise a material which, when heated to within a preselected range of temperatures, softens sufficiently to allow it to be penetrated by the reinforcing fibers 22 when pressed into the gel 26. However, although softened to the point of allowing penetration of the fibers 22, the gel 26 has a viscosity substantially greater than the viscosity of the resin 24 at cure temperatures. In fact, at cure temperatures, when compressed together, the gel 26 will displace the resin 24 due to the higher viscosity of the gel 26 compared to that of the resin 24. Although not shown in FIGS. 2 and 3, the gel 26 may contain a 3-D scrim to provide the gel 26 with a desired degree of vertical support in order to prevent the gel 26 from collapsing and being squeezed out when laminate 20 is compressed during curing. Also, although not specifically shown in the Figures, it should be noted here that the plies of the laminate 20 near the tool surface 28 are full plies that deform and extend up and over the gel 26. In practical embodiments, the thickness of the gel 26 may be at least as great as two pre-preg plies of the laminate 20.

The particular material selected for use as the gel 26 may vary with the application, including the type of resin 24 and the cure temperatures. In one typical application, the gel 26 may comprise a suitable relatively soft plastic such as Alumisol, Pastisol or a polyvinyl chloride dispersion. Other materials may be used such as polymers that may contain a viscoelastic liquid or a similar material that does not adversely react with either the resin 24 or the fibers 22. In other applications, the gel 26 may comprise, without limitation, a water soluble organic material.

In some embodiments, depending on the particular type of gel material being used, the viscosity of the gel 26 may not be reduced substantially by the application of heat to the laminate 20, while the viscosity of the resin will be reduced enough to provide the necessary differential in viscosities between the gel 26 and the resin that is required to allow the gel 26 to displace the resin 24 during curing of the laminate 20. However, the viscosity of the gel 26 must be low enough to allow the fibers 22 to penetrate the gel sheet 26 during cure. Depending upon the particular materials used for the resin 24 and the gel 26, the viscosity of the resin 24 and the viscosity of the gel 26 may change at different rates as heat is applied to the laminate 20. Thus, it may be possible that the resin 24 has a viscosity that is equal to or greater than that of the gel 26 at room temperature but is reduced substantially below the viscosity of the gel 26 when the laminate 20 is heated. The ability of the gel 26 to displace the resin 24, and be penetrated by the fibers 22, may be affected by the amount of pressure used to compress the laminate 20 and the gel 26 together during curing.

Figure 5:
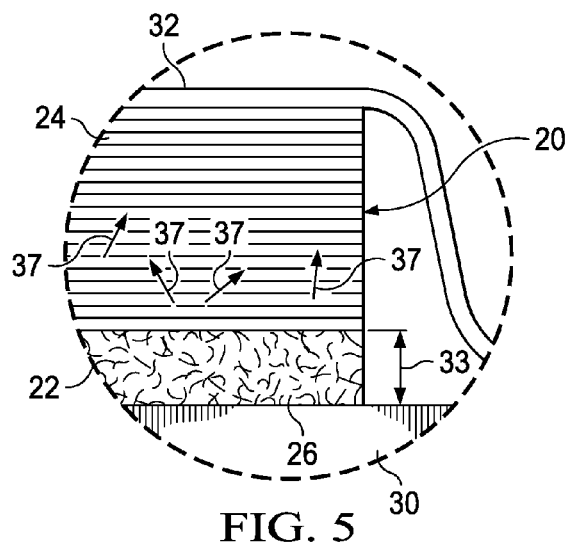
FIG. 5 is an illustration of a sectional view of the area designated as FIG. 5 in FIG. 4.

Referring now to FIGS. 4 and 5, the gel sheet and the laminate 20 are compressed together using any suitable technique or tooling, such as by compression molding using an open or closed mold, vacuum bag processing, with or without a caul plate, in which a vacuum bag 32 is placed over the laminate 20 and sealed to the surface 28 of the tool 30 using conventional seals 34. Although not shown in FIGS. 4 and 5, layers of other materials, such as release films, breathers, caul plates, etc. may be placed over the laminate 20 beneath the vacuum bag 32 in preparation for curing the laminate 20. The vacuum bag 32 may be coupled with a suitable vacuum source (not shown), and the tool 30 may be placed in an oven or an autoclave (not shown) where a combination of autoclave pressure and vacuum bag pressure are applied to the laminate 20, forcing the laminate 20 down against the gel sheet 26 and the tool 30.

During the curing process, the laminate 20 is heated according to a predetermined cure schedule. As the temperature of the laminate 20 increases during heating, the viscosity of the resin 24 is reduced to the point that the resin 24 flows relatively freely, allowing the resin between the plies of the laminate 20 to flow together. The elevated temperatures during curing also soften the gel sheet 26 to the point that the fibers 22 above the gel sheet 26 penetrate and move into the gel sheet 26 under the force applied through the vacuum bag 32. At these elevated temperatures, however, the viscosity of the gel in the gel sheet 26 is substantially greater than that of the resin 24 whose viscosity has been reduced due to heating. As a result of this viscosity differential, the gel being forced into the laminate 20 displaces resin 24 while receiving and being penetrated by the fibers 22. The resin 24 that is displaced by the gel sheet 26 disperses and migrates 37 to other areas of the laminate 20.

Following curing of the laminate 20, fibers 22 within the section 25 that have been compressed against the gel sheet 26 are encapsulated with gel, but are substantially free of resin 24. It should be noted here that while heating the laminate 20 has been illustrated as a means of reducing the viscosity of the resin, other techniques for reducing the viscosity of the resin may be possible. For example, the laminate 20 may include an activatable material or compound, either incorporated into the resin or placed between layers of the laminate, that reacts with the resin in a manner that reduces the viscosity of the resin. The activatable material or compound may be activated, for example, and without limitation, using a suitable form of radiation, such as microwave energy.

After the laminate 20 has been cured, it is de-bagged, and removed from the tool 30. The gel 26 may then be removed from the laminate 20 by exposing the gel 26 to a suitable solvent which dissolves the gel 26. Dissolving the gel 26 in this manner exposes the fibers 22 along the faying surface 35. Other techniques for removing the gel 26 from the fibers 22 may be possible. The same or a similar solvent may be employed to clean away any gel 26 that may remain on the surface 28 of the tool 30. It should be noted here, that optionally, it may be desirable to select a gel 26 that chemically reacts with the fibers 22 to some degree in a manner that etches the surface of the fibers 22 so that they will more readily adhere to an adhesive used to bond the laminate 20 to another structure. Although not shown in the Figures, it may also be desirable to mask off the faying surface 35 of the laminate 20 so that the gel 26 does not undesirably migrate to other surface areas of the laminate 20 during the curing process.

It should be noted here that while the illustrated method has been described in connection with exposing reinforcing fibers of a laminate during curing using the vacuum bagging techniques, the displacement gel 26 may be similarly used in other types of processes for fabricating composite laminates, such as compression molding and resin infusion processes.

Figure 6:
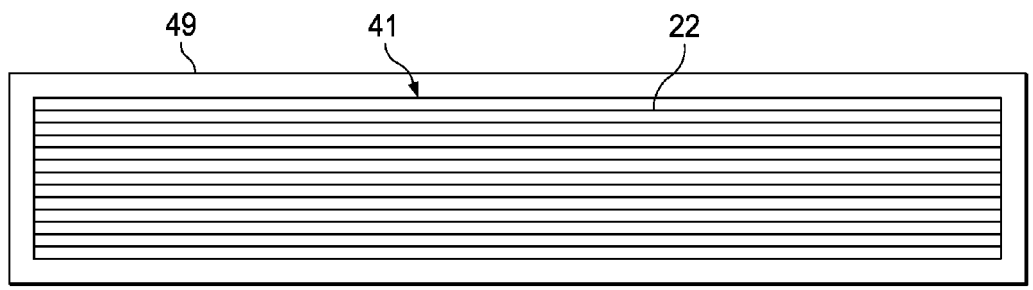
FIG. 6 is an illustration of a cross-sectional view of a mold cavity containing a fiber preform reinforcement.
Figure 7:
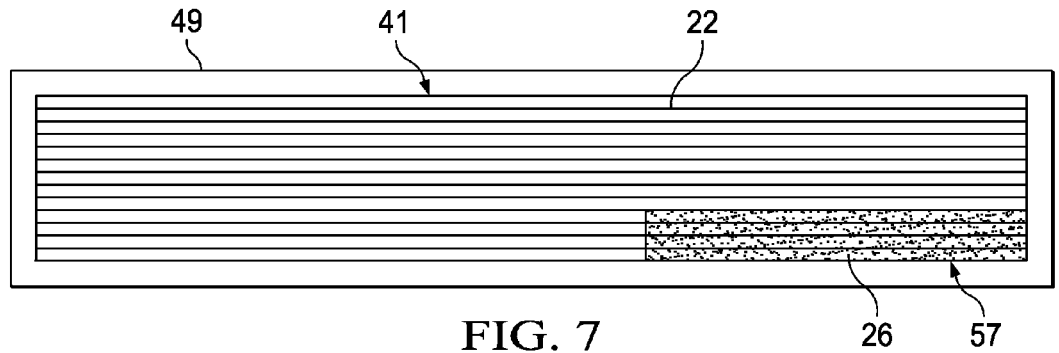
FIG. 7 is an illustration similar to FIG. 6 but showing a portion of the fiber preform reinforcement having been impregnated with a gel.

Attention is now directed to FIGS. 6-9 which illustrate use of the displacement gel 26 described above to expose reinforcing fibers of a fiber preform reinforcement after it has been infused with resin and cured. Referring particularly to FIG. 6, a fiber preform reinforcement 41 may be assembled, for example and without limitation, by tacking, weaving or knitting reinforcing fibers 22, which may or may not be tackified to assist in holding the fibers 22 together. The fiber preform reinforcement 41 may be placed in a mold cavity 49 or other tool that is used to contain and shape the resin 24 during the resin infusion process. As shown in FIG. 7, a portion of the fiber preform reinforcement 41 is impregnated with a gel 26 which prevents infusion of the portion 53 with resin. In some embodiments, the gel 26 may substantially completely encapsulate the fibers in selected portions of the fiber preform reinforcement 41. The gel 26 may be similar to that described previously, and has a viscosity substantially greater than that of the resin 24 during the resin infusion process.

Figure 8:
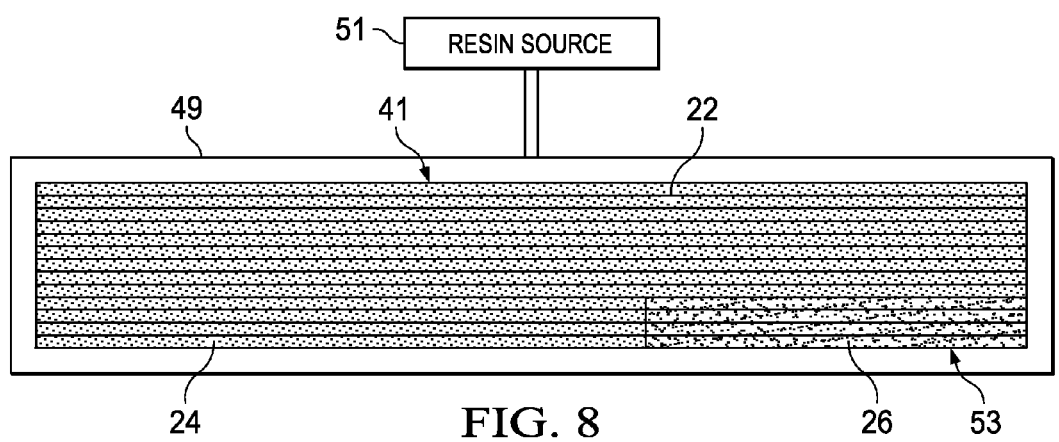
FIG. 8 is an illustration similar to FIG. 7, but showing the fiber preform reinforcement having been infused with resin.
Figure 9:
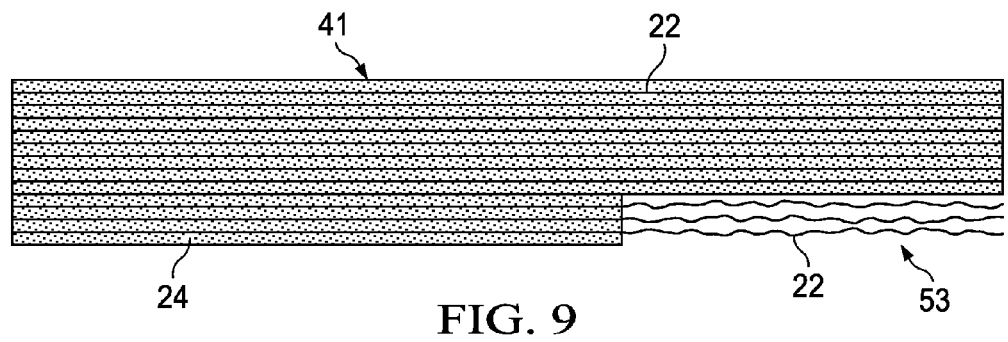
FIG. 9 is an illustration similar to FIG. 8, but showing the cured part having been removed from the mold cavity, and the gel removed to expose fibers of the reinforcement.

Referring to FIG. 8, the mold cavity 49 is coupled with a source of resin 51. Although not shown in FIG. 8, the mold cavity 49 may be adapted to be coupled with a vacuum source in order to carry out vacuum-assisted resin infusion of the fiber preform reinforcement 41, however other techniques of resin infusion are possible. After the fiber preform reinforcement 41 has been infused with resin 24, the resin infused preform reinforcement 41 is cured, following which the cured part may be removed from the mold cavity 49. Referring to FIGS. 8 and 9, after the part has been removed from the mold, the gel 26 is removed to expose the fibers 22 in the portion 53 of the infused fiber preform reinforcement 41 that was protected by the gel 26. The gel 26 may be removed using any suitable technique, such as by subjecting the gel 26 to a solvent that dissolves away the gel 26. In the example shown in FIGS. 7-9, the portion 53 in which the fibers 43 are exposed lies along one side of the part and may form a faying surface of the part, however other areas of the part may have fibers exposed using the gel 26 as described above.

Figure 10:
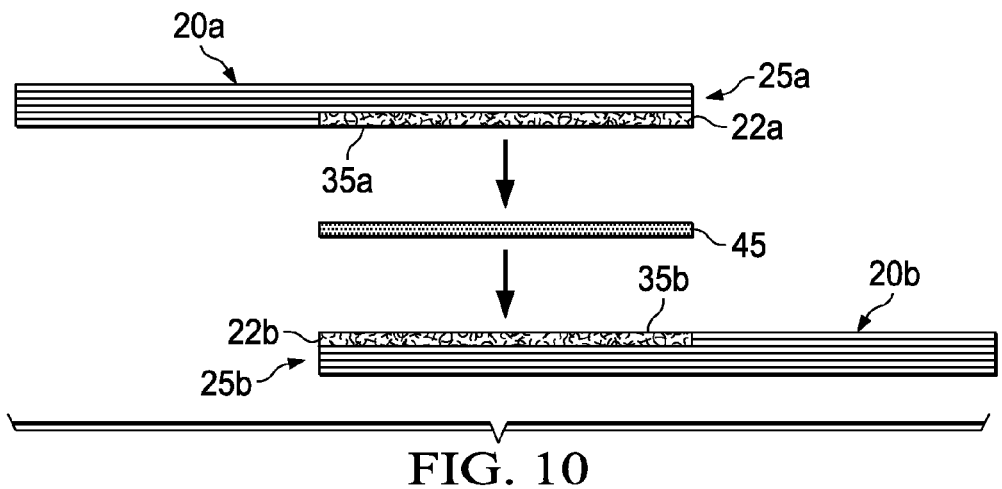
FIG. 10 is an illustration of an exploded side view of two laminate parts having exposed fibers, about to be bonded together.
Figure 11:
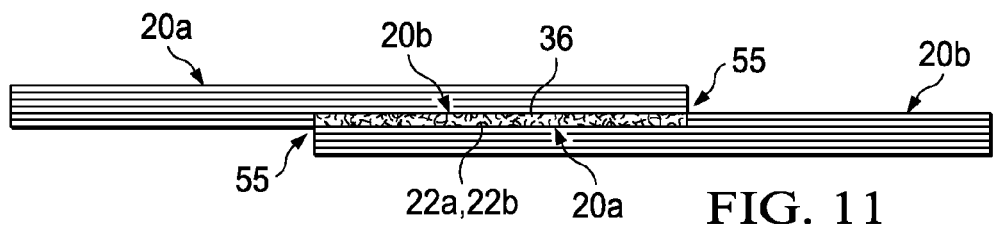
FIG. 11 is an illustration of the two laminate parts shown in FIG. 10 following a secondary bonding operation.

Referring now to FIGS. 10 and 11, the method of exposing fibers 22 along a faying surface 35 of a fiber reinforced resin laminate 20 described above may be used in a process for joining two pre-cured laminate parts 20a, 20b in a secondary bonding operation. The process results in a strong, robust joint 55 between faying surfaces 35a, 35b of the laminate parts 20a, 20b which may resist propagation of cracks due to the presence of surface contaminates or other reasons. Crack propagation is resisted due to the fact that the joint 55 is formed by a volume of cured adhesive that envelops reinforcing fibers 22 of both laminate parts 20a, 20b. In contrast, traditional bonded joints rely on only a relatively thin layer of bonding adhesive that does not envelop the reinforcing fibers. In the illustrated example, the reinforcing fibers 22 in the faying surfaces 35a, 35b of the two laminate parts 20a, 20b respectively have been exposed using the method previously described. A layer of suitable adhesive 45, which may be in film or paste form, is placed between the faying surfaces 35a, 35b, which has now become a volume. The faying surfaces 35a, 35b are brought into contact with each other and held together, forcing the fibers 22a, 22b to interpenetrate each other. The pre-cured laminate parts 20a 20b are pressed together using any suitable technique, including using a mold press or vacuum bagging (not shown). The exposed fibers 22 are infused with a suitable resin bonding adhesive 45, either before or after the faying surfaces 35a, 35b are pressed together.

Figure 12:
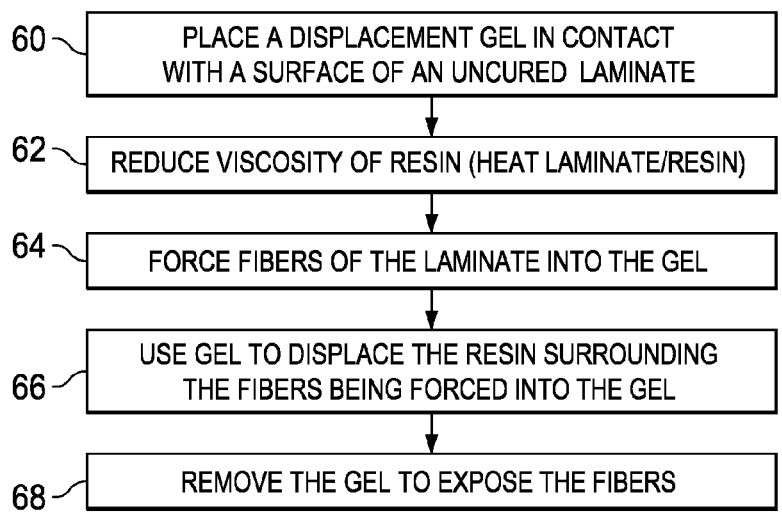
FIG. 12 is an illustration of a flow diagram of one embodiment of a method of exposing reinforcing fibers in a fiber reinforced resin laminate.

FIG. 12 illustrates the overall steps of one embodiment of a method for exposing fibers in a fiber reinforced resin laminate 20. Beginning at 60, a displacement gel 26 is placed in contact with a surface 35 of the laminate 20. At step 62, the viscosity of the resin 24 in the laminate 20 is reduced to the point that it is substantially less than that of the gel 26. Reducing the viscosity of the resin 24 may be achieved, for example and without limitation, by heating the laminate 20 to at least the temperature at which the resin 24 begins to flow. Heating of the laminate 20 may be performed by placing the laminate 20 in an oven (not shown), however, a variety of other heating methods are possible. At step 64, the reinforcement fibers 22 near the laminate surface 35 are forced into the gel 26, and at 66, the gel 26 is used to displace the resin surrounding the fibers 22 that are being forced into the gel 26. At step 68, the gel 26 is removed to expose the fibers 22. As previously discussed, the gel may be removed by dissolving it with a suitable solvent.

Figure 13:
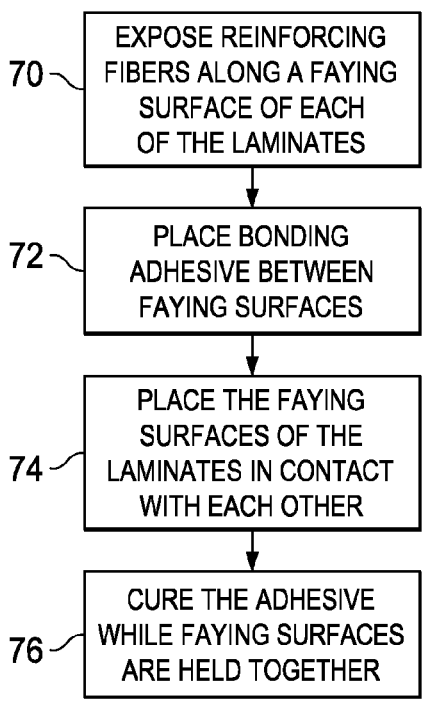
FIG. 13 is an illustration of a flow diagram of a method of bonding together faying surfaces of two fiber reinforced resin laminate parts.

FIG. 13 illustrates the steps of a method of joining two, pre-cured composite laminates 20a, 20b in which faying surfaces 35a, 35b of the laminates 20a, 20b are bonded together in a secondary bonding operation. At step 70, reinforcing fibers 22 along the faying surfaces 35a, 35b of each of the laminates 20a, 20b are exposed. Exposing the fibers 22 may be performed, for example and without limitation, using the method shown in FIG. 12. At step 72, a suitable bonding adhesive, which may be in film or paste form, is placed between the faying surfaces 35a, 35b of the laminates 20a, 20b, thereby infusing the exposed fibers 22 with the adhesive. At step 74, the faying surfaces 35a, 35b of the two laminates 20a, 20b are placed in contact with each other, and may be compressed together using any suitable technique. At step 76, the bonding adhesive is cured, using thermal or other techniques, while the faying surfaces 35a, 35b of the two laminates 20a, 20b are being held together, resulting in a strong, robust bonded joint between the two laminates 20a, 20b.

Figure 14:
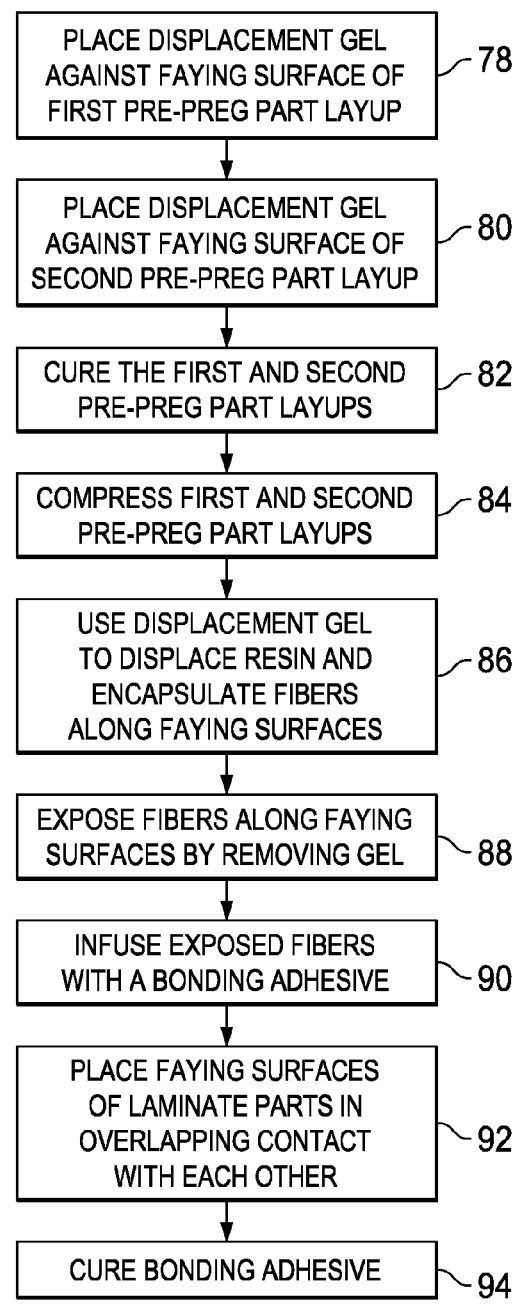
FIG. 14 is an illustration of a flow diagram of a method of joining two fiber reinforced resin parts using a bonded joint.

Attention is now directed to FIG. 14 which broadly illustrates the steps of another embodiment of a method joining two composite laminates 20a, 20b together using a bonded joint. Beginning at step 78, a displacement gel 26 of the type previously described is placed against a faying surface 35a of the first pre-preg part layup 20a. The displacement gel 26 is also placed against the faying surface 35b of a second pre-preg part layup 20b. At step 82, the first and second pre-preg part layups 20a, 20b are cured. Curing may be performed by elevating the temperature of the layups to a cure temperature using an oven, autoclave or other equipment. At 84, each of the first and second pre-preg part layups 20a, 20b is compressed with the displacement gels 26. As the part layups are being compressed, and as shown in step 86, the displacement gel 26 is used to displace resin in the plies of the layup, and thereby encapsulate reinforcing fibers 22 along faying surfaces 35a, 35b of the composite laminates 20a, 20b. At step 88, the reinforcing fibers 22 along the faying surfaces 35a, 35b of the laminates 20a, 20b are exposed by removing the displacement gel 26. The displacement gel 26 may be removed by dissolving it using a suitable solvent, as described earlier. Next, at step 90, the exposed fibers 22 along the faying surfaces 35*a*, 35*b* of the two laminates 20*a*, 20*b* are infused with a suitable bonding adhesive which may be in film or paste form. At step 92, the faying surfaces 35*a*, 35*b* of the cured laminates 20*a*, 20*b* are placed in overlapping contact with each other. Finally, at step 94, the bonding adhesive is cured to form a bonded joint between the laminates 20*a*, 20*b*.

Figure 15:
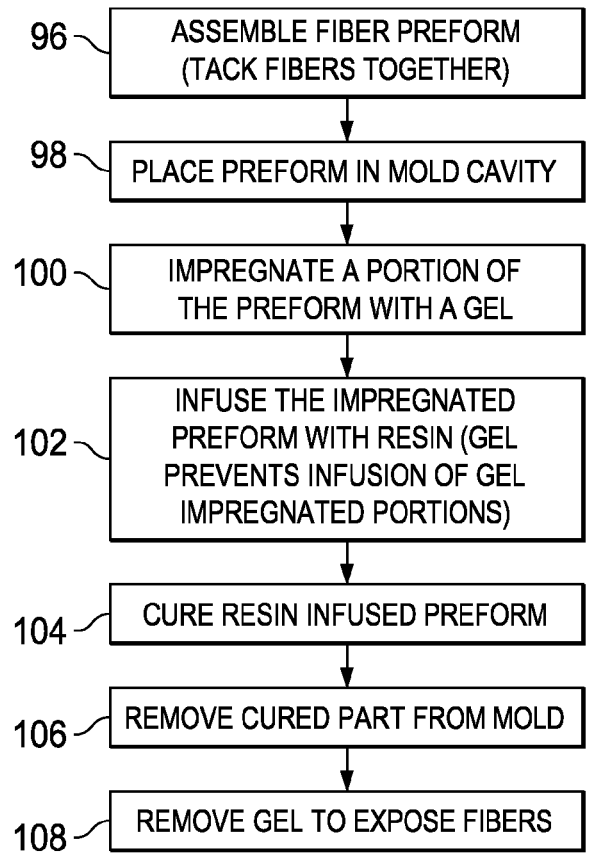
FIG. 15 is an illustration of a flow diagram of a method of exposing fibers of a resin infusion preform reinforcement using the disclosed displacement gel.

FIG. 15 illustrates still another embodiment of the disclosed method of exposing reinforcing fibers 22 in a laminate 20 that is fabricated by resin infusion of a fiber preform reinforcement 41. Beginning at step 96, a fiber preform reinforcement 41 is assembled by any suitable means which may include tacking the fibers 22 together. At 98, the fiber preform reinforcement 41 is placed in a mold cavity 49 or similar tool that is used to form the shape of a finished composite part. At step 100, a portion 53 of the fiber preform reinforcement 41 is impregnated with a gel 26, thereby encapsulating the fibers 22 within the portion 53 of the fiber preform reinforcement 41. Next, at 102, the gel impregnated fiber preform reinforcement 41 is infused with resin 24. During this resin infusion process, the gel 26 functions to prevent resin infusion of the portion 53 of the fiber preform reinforcement 41 where the fibers 22 are to be exposed. At step 104, the resin infused fiber preform reinforcement 41 is cured, following which the cured part may be removed from the mold cavity 49 at step 106. Finally, at step 108, the gel 26 is removed, as by dissolving it with a solvent, thereby exposing the fibers 22 in the portion 53 of the fiber preform reinforcement 41.

Figure 16:
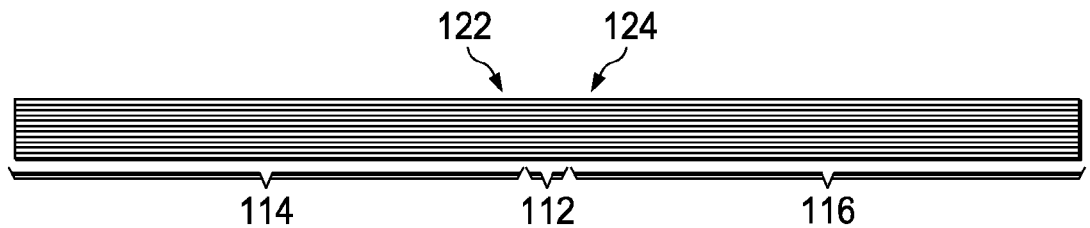
FIG. 16 is an illustration of a sectional view of a composite structure formed by two composite laminates joined by a butt joint.

The disclosed method of exposing reinforcing fibers in a composite laminate using the displacement gel may also be used to form a butt joint between two composite laminate parts. For example, referring to FIG. 16, two cured, fiber reinforced resin laminate parts 114, 116 may be joined together along their respective edges 122, 124 by a butt joint 112 in a secondary bonding operation described below. The reinforcing fibers along the edges 122, 124 overlap each other within the butt joint 112, allowing the desired loads to be transferred between the two composite laminate parts 114, 116, thereby reducing or eliminating the need for fasteners or overlapping splice plies to join the laminate parts 114, 116 together.

Figure 17:
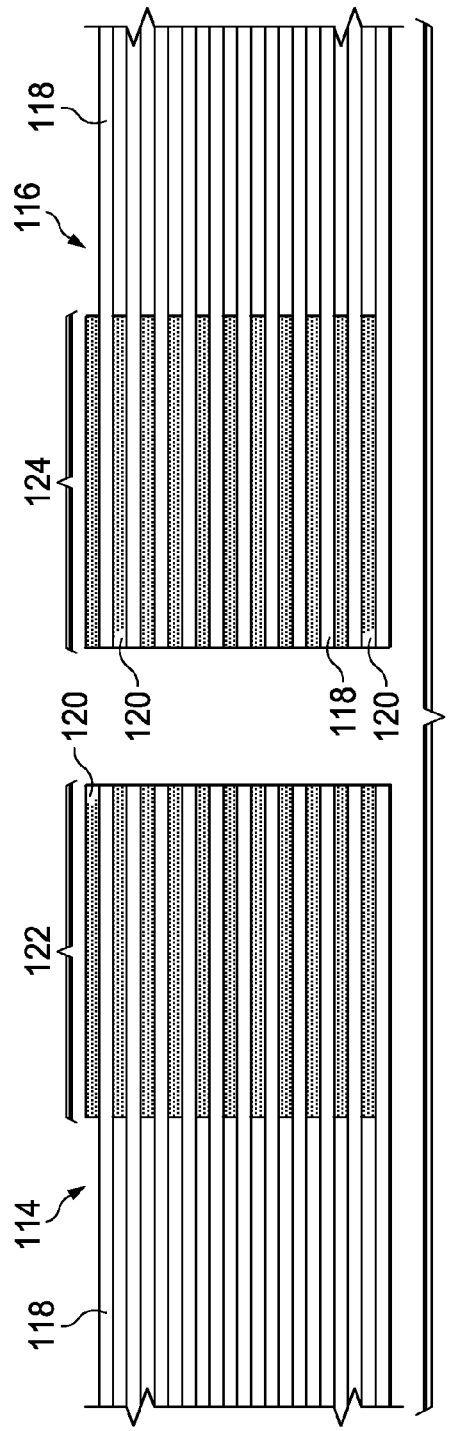
FIG. 17 is an illustration of a sectional view of two pre-preg layups used to fabricate the composite laminates shown in FIG. 16.

Referring now to FIG. 17, each of the composite laminate parts 114, 116 is formed by assembling a composite laminate part layup using a plurality of pre-preg plies 118. Sheets or plies 120 of a displacement gel of the type previously described are interspersed among the pre-preg plies 118 in the layup, along edges 122, 124. The plies 120 of the displacement gel may be laid up in predetermined layering sequence as the pre-preg plies 118 are being laid up. In the illustrated example, the pre-preg plies 118 and the displacement gel plies 120 alternate in the layup so that each of the pre-preg plies 118 is in contact with at least one ply 120 of the displacement gel. In other embodiments, however, fewer plies 120 of the displacement gel may be employed, depending upon the number and thickness pre-preg plies 118, as well as the particular type of resin and fiber reinforcement that are used. For example, it may be possible to intersperse plies 120 of the displacement gel between groups of four of the pre-peg plies 118, resulting in a 4:1 ratio of pre-preg plies 118 to displacement gel plies 120.

After laying up each of the composite laminate parts 114, 116 as described above, the laminate part layups may be cured in an oven, autoclave or by other techniques in which the part layups are heated to the cure temperature of the resin while being compressed using a vacuum bag (not shown) or other techniques. As in embodiments previously described, the displacement gel displaces the resin along the edges 122, 124 of the laminates 114, 116 during the curing process, thereby encapsulating the reinforcing fibers 126 along the edges 122, 124. Following curing, the displacement gel may be removed from the edges 122, 124, as by dissolving the displacement gel with a solvent, or using other techniques.

Figure 18:
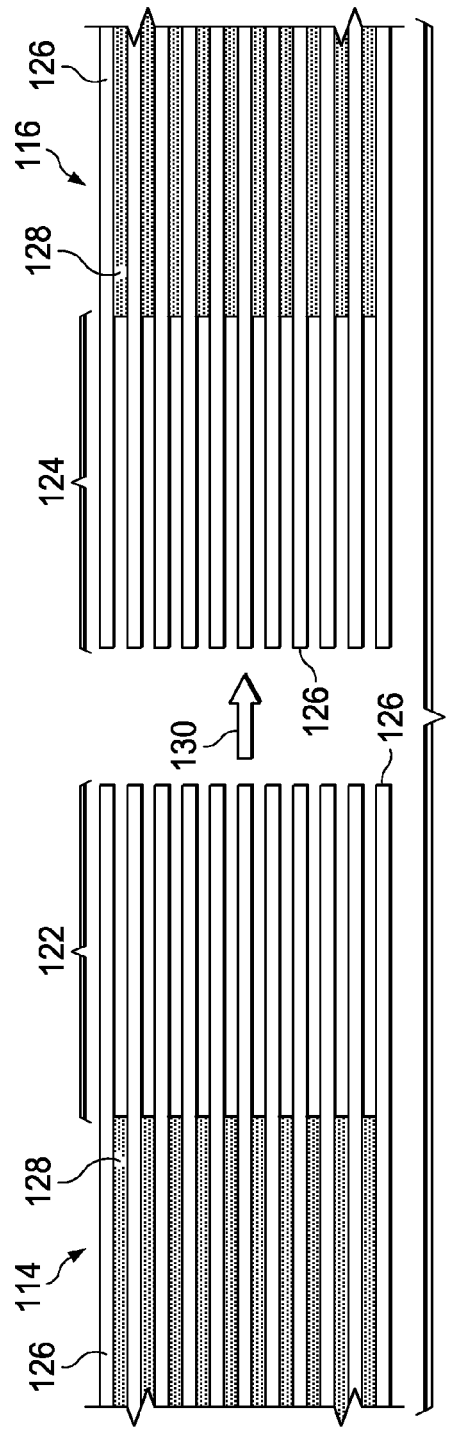
FIG. 18 is an illustration similar to FIG. 17, but showing the layups having been cured and the displacement gel removed to expose reinforcement fibers along edges of the laminates.
Figure 19:
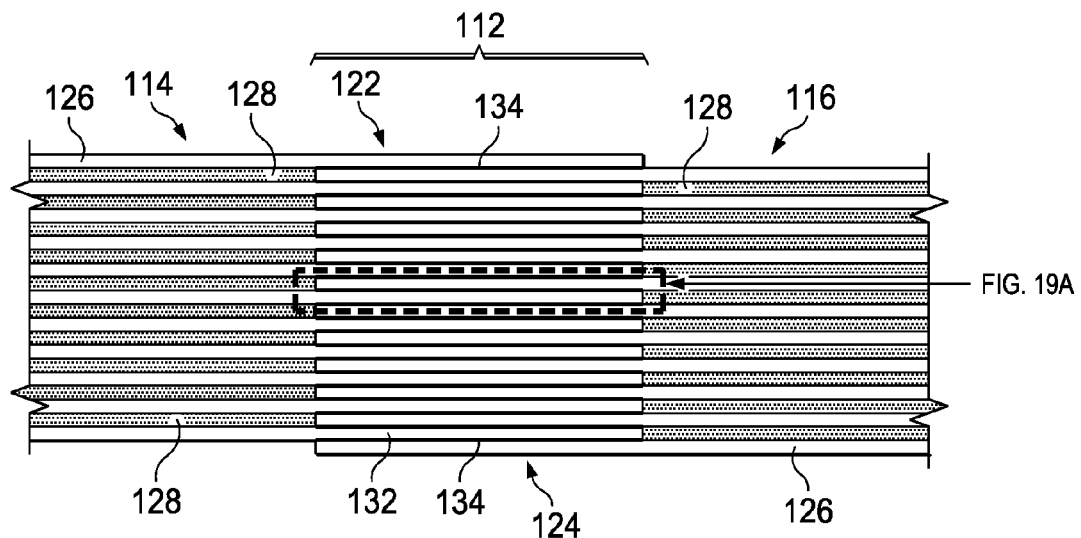
FIG. 19 is an illustration of a sectional view showing additional details of the butt joint shown in FIG. 16.
Figure 19A:
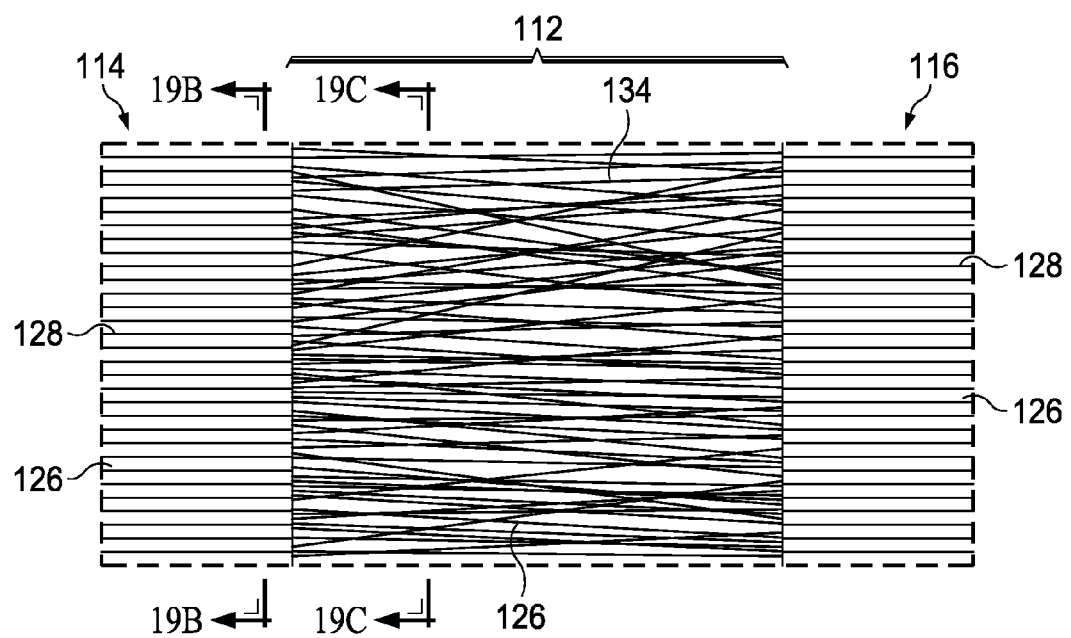
FIG. 19A is an illustration of the area designated as FIG. 19A in FIG. 19, better depicting interpenetration of the fibers in the butt joint.
Figure 19B:
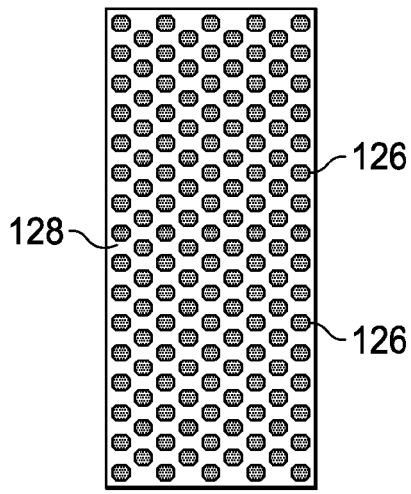
FIG. 19B is an illustration of a sectional view taken along the line 19B-19B in FIG. 19A.
Figure 19C:
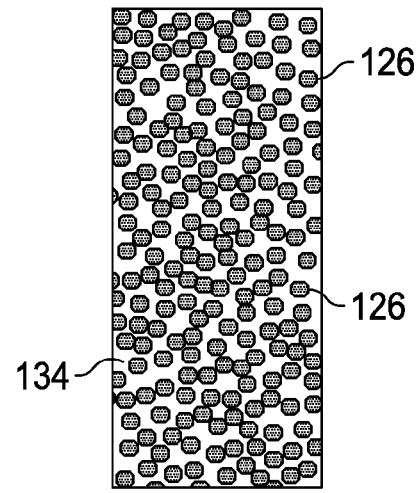
FIG. 19C is an illustration of a sectional view taken along the line 19C-19C in FIG. 19A.

FIG. 18 illustrates the displacement gel having been removed to expose the reinforcing fibers 126 along the edges 122, 124 of the two laminate parts 114, 116 respectively. In FIG. 18, for ease of illustration and description, the fibers 126 are shown as being parallel to each other and grouped together, similar to the arrangement of the pre-preg plies 118 in FIG. 17. In practice, however, as will become apparent below, the fibers 126 may not be parallel to each other or arranged in laminar-like groups, but rather may be somewhat dispersed and randomly oriented, similar to a group of "stiff whiskers" that are slightly spaced from each other but extend laterally outward at the edges 122, 124 of the laminates 114, 116.

Referring now to FIGS. 18, 19, 19A, 19B and 19C, the two composite laminate parts 114, 116 are joined together by axially displacing 130 (FIG. 18) the parts 114, 116 toward each other so that the exposed fibers 132 interpenetrate and overlap each other, effectively merging the edges 122, 124 together. The exposed fibers 126 are infused with a suitable bonding adhesive 134, either before the two edges 122, 124 are merged together, or after they are merged, using any suitable technique. The adhesive 134 is then cured, using thermal or other curing techniques to produce a strong, robust, bonded butt joint 112. As in the lap joint embodiment shown in FIG. 11, the butt joint 112 is particularly strong and robust, and is effective in resisting propagation of cracks therethrough because the butt joint 112 is formed by a volume of cured adhesive 134 that envelops reinforcing fibers 22 of both laminate parts 114, 116 and integrates the two laminate parts 114, 116 over substantially the entire thickness and length of the joint 112.

Figure 20:
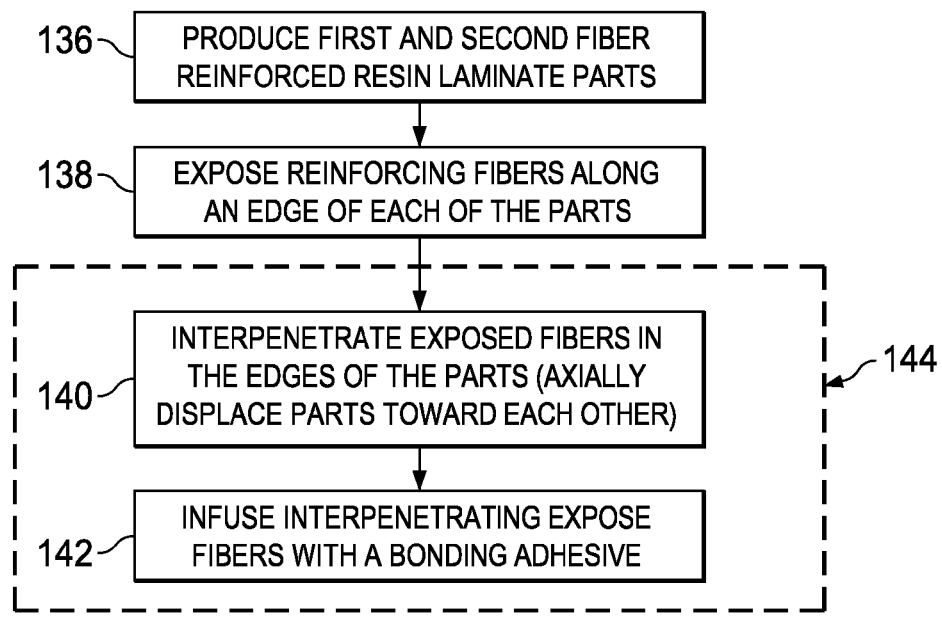
FIG. 20 is an illustration of a flow diagram of a method of joining two composite laminate parts using a butt joint.

FIG. 20 broadly illustrates the steps of the method of forming the bonded butt joint 112 previously described in connection with FIGS. 18, 19 and 19A-19C. Beginning at step 136, first and second fiber reinforced resin laminate parts 114, 116 are produced, as by laying up a combination of pre-preg plies 118 and displacement gel plies 120 in a predetermined sequence. At 138, the reinforcing fibers 126 along edges 122, 124 of the laminate parts 114, 116 are exposed by dissolving the displacement gel used to displace resin along the part edges 122, 124 during the curing process. A butt joint 112 may then be formed at 144 by axially displacing the laminate parts 114, 116 toward each other at 140, and then infusing the interpenetrating, exposed fibers 126 with a bonding adhesive 142 that is subsequently cured. As previously discussed, as the laminate parts 114, 116 are axially displaced toward each other, the exposed fibers 126 within the edges 122, 124 interpenetrate each other, allowing the edges 122, 124 to merge with each other.

Figure 21:
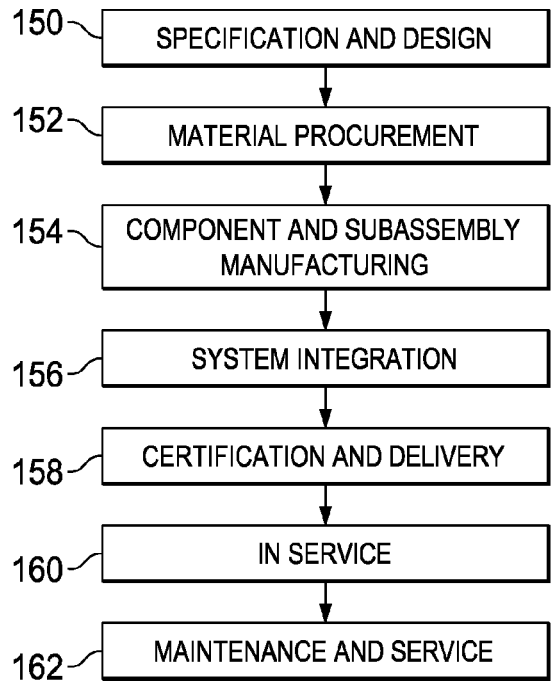
FIG. 21 is an illustration of a flow diagram of aircraft production and service methodology.
Figure 22:
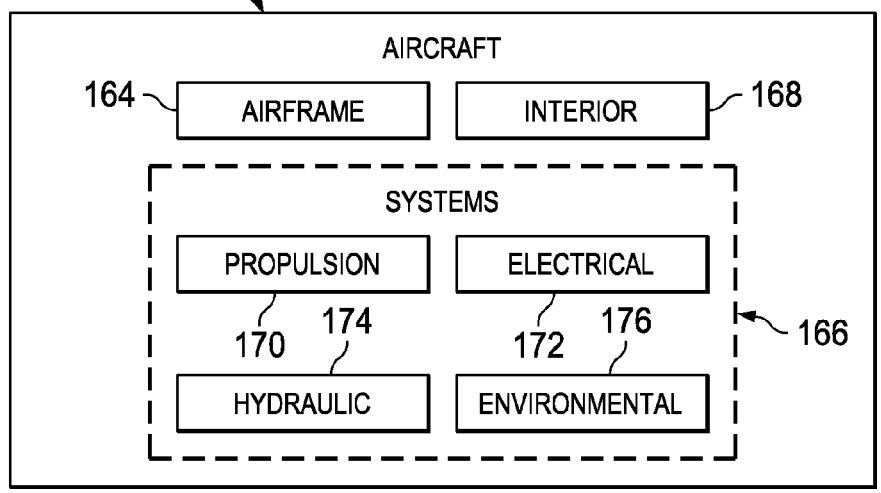
FIG. 22 is an illustration of a block diagram of an aircraft.

Embodiments of the disclosure may find use in a variety of potential applications, particularly in the transportation industry, including for example, aerospace, marine, automotive applications and other application where it may be necessary to join pre-cured composite parts. Thus, referring now to FIGS. 21 and 22, embodiments of the disclosure may be used in the context of an aircraft manufacturing and service method 146 as shown in FIG. 21 and an aircraft 148 as shown in FIG. 22. Aircraft applications of the disclosed embodiments may include, for example, without limitation, joining of pre-cured laminate parts and subassemblies, including but not limited to stiffener members, skins and interior parts, to name only a few. During pre-production, the exemplary method 146 may include specification and design 150 of the aircraft 148 and material procurement 152. During production, component and subassembly manufacturing 154 and system integration 156 of the aircraft 148 takes place. Thereafter, the aircraft 148 may go through certification and delivery 158 in order to be placed in service 160. While in service by a customer, the aircraft 148 is scheduled for routine maintenance and service 162, which may also include modification, reconfiguration, refurbishment, and so on.

Each of the processes of method 146 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 148 produced by exemplary method 146 may include an airframe 164 with a plurality of systems 166 and an interior 168. Examples of high-level systems 166 include one or more of a propulsion system 170, an electrical system 172, a hydraulic system 174, and an environmental system 176. Any number of other systems may be included. Although an aerospace example is shown, the principles of the disclosure may be applied to other industries, such as the marine and automotive industries.

Systems and methods embodied herein may be employed during any one or more of the stages of the production and service method 146. For example, components or subassemblies corresponding to production process 154 may be fabricated or manufactured in a manner similar to components or subassemblies produced while the aircraft 148 is in service. Also, one or more apparatus embodiments, method embodiments, or a combination thereof may be utilized during the production stages 154 and 156, for example, by substantially expediting assembly of or reducing the cost of an aircraft 148. Similarly, one or more of apparatus embodiments, method embodiments, or a combination thereof may be utilized while the aircraft 148 is in service, for example and without limitation, to maintenance and service 162.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of exposing fibers in a fiber reinforced resin laminate, comprising:
    placing a gel in contact with at least a section of a surface of the resin laminate;
    forcing the fibers of the laminate into the gel by compressing the gel and the laminate together; and
    using the gel to displace resin surrounding the fibers being forced into the gel.

2. The method of claim 1, further comprising:
    reducing a viscosity of the resin to a viscosity less than the viscosity of the gel.

3. The method of claim 2, wherein reducing the viscosity of the resin is performed by heating the laminate to a temperature at which the resin is flowable.

4. The method of claim 1, further comprising:
    curing the laminate, including heating the laminate to a temperature that reduces the viscosity of the resin to a viscosity that is substantially less than the viscosity of the gel.

5. The method of claim 1, further comprising:
    exposing the fibers by removing the gel from the fibers forced into the gel.

6. The method of claim 5, wherein removing the gel is performed by subjecting the gel to a solvent in which the gel dissolves.

7. The method of claim 5, further comprising using the gel to etch surfaces of the exposed fibers.

8. The method of claim 1, wherein placing a gel in contact with at least a section of a surface of the resin laminate is performed by placing a gel in face-to-face contact with the surface of the resin laminate.

9. The method of claim 1, wherein compressing the gel and the laminate together is performed using a vacuum bag to compress the resin laminate against the gel.

10. The method of claim 9, further comprising:
    sandwiching the gel between a tool and the resin laminate, and
    using the vacuum bag to compress the resin laminate against the gel includes placing the vacuum bag over the resin laminate and the gel, sealing the vacuum bag to the tool, and drawing a vacuum in the vacuum bag.

11. A method of joining first and second fiber reinforced resin laminate parts, comprising:
    placing a displacement gel against a faying surface of a first pre-preg laminate part layup;
    placing a displacement gel against a faying surface of a second pre-preg laminate part layup;
    curing each of the first and second laminate part layups to produce first and second cured laminate parts, including heating each of the first and second laminate part layups to a cure temperature;
    compressing each of the first and second laminate part layups;
    using the displacement gel to displace the resin and encapsulate the fibers along the faying surfaces of the first and second laminate part layups during curing of the laminate parts;
    exposing the fibers along the faying surfaces by removing the gel encapsulating the fibers;
    placing the faying surfaces of the first and second laminate parts in overlapping contact with each other;
    infusing the exposed fibers with a bonding adhesive; and,
    curing the bonding adhesive.

12. The method of claim 11, wherein placing the displacement gel against the faying surface of the first pre-preg laminate part layup includes placing a sheet of the displacement gel on a tool, and placing the first pre-preg laminate part layup on the tool, overlying the sheet of the displacement gel.

13. The method of claim 12, wherein encapsulating the fibers is performed by:
    sealing a vacuum bag over the tool,
    drawing a vacuum within the vacuum bag, and
    using the vacuum to force fibers into the sheet of the displacement gel.

14. The method of claim 11, wherein the displacement gel has a viscosity substantially greater than a viscosity of the resin at the cure temperature.

15. The method of claim 11, wherein compressing each of the first and second laminate part layups is performed using a vacuum bag.

16. The method of claim 11, wherein the displacement gel encapsulating the fibers is removed after the first and second laminate part layups have been cured.

17. The method of claim 11, wherein placing the faying surfaces of the first and second laminate parts in overlapping contact with each other includes interpenetrating the exposed fibers of the faying surfaces of the first and second laminate parts.

18. The method of claim 11, wherein removing the displacement gel to expose the fibers is performed by subjecting the displacement gel to a solvent in which the displacement gel dissolves.

19. The method of claim 12, further comprising:
removing displacement gel from the tool by cleaning the tool with a solvent in which the displacement gel dissolves.

20. The method of claim 11, wherein the faying surfaces of the first and second laminate parts forms a lap joint.

21. A method of bonding together two fiber reinforced resin laminates, comprising:
exposing reinforcing fibers in a section of each of the laminates by displacing resin surrounding the fibers with a gel;
applying a bonding adhesive to the exposed fibers in the sections of each of the laminates;
placing the sections of the laminates in contact with each other; and
curing the bonding adhesive.

22. The method of claim 21, wherein exposing reinforcing fibers in a section of each of the resin laminates is performed by:
reducing a viscosity of the resin of each of the laminates by heating the laminates, and
using the gel to displace resin in the sections of the laminate where the viscosity of the resin has been reduced by the heating.

23. The method of claim 21, wherein exposing reinforcing fibers in a section of each of the resin laminates is performed by:
placing the gel in contact with each of the sections of the resin laminates,
forcing the fibers of each of the laminate into the gel by compressing each of the laminates against the gel, and
using the gel to displace resin surrounding the fibers of each of the laminates being forced into the gel.

24. The method of claim 21, wherein:
exposing fibers in a section of each of the laminates includes exposing reinforcing fibers in a faying surface of each of the laminates, and
placing the sections of the laminate in contact with each other includes placing the faying surfaces of the laminates in face-to-face contact with each other.

25. A method of fabricating a fiber reinforced composite part, comprising:
assembling a fiber preform reinforcement;
impregnating at least one portion of the fiber preform reinforcement with a gel;
infusing the fiber preform reinforcement with resin;
using the gel to prevent infusion of the portion of a fiber preform reinforcement with resin; and
exposing fibers in the portion of the fiber preform reinforcement by removing the gel.

26. The method of claim 25, wherein the gel has a viscosity substantially greater than the viscosity of the resin when the resin is infused into the fiber preform reinforcement.

27. The method of claim 26, further comprising:
curing the resin infused fiber preform reinforcement, and
wherein removing the gel is performed using a solvent to dissolve the gel away from the fiber preform reinforcement.

28. A method of making a composite structure, comprising:
producing first and second fiber reinforced resin laminate parts;
exposing reinforcing fibers along an edge of each of the first and second laminate parts by displacing resin surrounding the fibers with a displacement gel; and
forming a butt joint between the edges of the first and second laminate parts, including interpenetrating the exposed fibers along the edges of the first and second laminate parts and infusing the interpenetrating exposed fibers with a bonding adhesive.

29. The method of claim 28, wherein interpenetrating the exposed fibers along the edges of the first and second laminate parts is performed by axially displacing the first and second laminate parts toward each other until the exposed fibers of the edges overlap each other.

30. The method of claim 28, further comprising curing the bonding adhesive to integrally join the first and second laminate parts.

31. The method of claim 28 wherein:
forming the first and second laminate parts includes assembling first and second pre-preg layups and curing each of the first and second layups, and
exposing the reinforcing fibers includes-
interspersing plies of the displacement gel between pre-preg plies of each of the first and second layups,
using the displacement gel to displace resin along the edges of the first and second layups during curing, and
removing the displacement gel from the edges after the first and second laminate parts have been cured.

32. The method of claim 28, wherein exposing the reinforcing fibers includes displacing resin along the edges of the first and second laminate parts.

33. The method of claim 28, wherein exposing reinforcing fibers includes exposing the reinforcing fibers throughout the entire thickness of the edges of the first and second laminate parts.

34. A method of forming a butt joint between first and second fiber reinforced resin laminate parts, comprising:
exposing reinforcing fibers along an edge of each of the first and second laminate parts by displacing resin surrounding the fibers with a displacement gel;
axially displacing the first and second laminate parts toward each other until the reinforcing fibers of each of the first and second laminate parts interpenetrate each other; and
infusing the interpenetrating reinforcing fibers with a bonding adhesive.

35. The method of claim 34, wherein exposing the reinforcing fibers is performed using the displacement gel to displace resin along the edges of each of the first and second laminate parts.

36. The method of claim 34, wherein exposing the reinforcing fibers includes displacing resin along the edges of each of the first and second laminate parts throughout their entire thicknesses.

* * * * *